(12) United States Patent
Minami

(10) Patent No.: US 11,394,939 B2
(45) Date of Patent: *Jul. 19, 2022

(54) PROJECTION SYSTEM

(71) Applicant: Panasonic Intellectual Property Management Co., Ltd., Osaka (JP)

(72) Inventor: Kazuhiro Minami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/216,986

(22) Filed: Mar. 30, 2021

(65) Prior Publication Data
US 2021/0218942 A1 Jul. 15, 2021

Related U.S. Application Data

(63) Continuation of application No. 16/718,863, filed on Dec. 18, 2019, now Pat. No. 10,999,564, which is a
(Continued)

(30) Foreign Application Priority Data
Jun. 8, 2016 (JP) .............................. JP2016-114409

(51) Int. Cl.
*H04N 9/31* (2006.01)
*H04N 5/74* (2006.01)

(52) U.S. Cl.
CPC ......... *H04N 9/3155* (2013.01); *H04N 9/3161* (2013.01); *H04N 9/3164* (2013.01); *H04N 9/3185* (2013.01); *H04N 9/3194* (2013.01)

(58) Field of Classification Search
CPC .. H04N 9/3155; H04N 9/3161; H04N 9/3164; H04N 9/3105; H04N 9/3123;
(Continued)

(56) References Cited

U.S. PATENT DOCUMENTS

| 3,886,303 | A | 5/1975 | Morris |
| 7,390,092 | B2 | 6/2008 | Belliveau |

(Continued)

FOREIGN PATENT DOCUMENTS

| JP | 49-98267 | 9/1974 |
| JP | 50-134725 | 10/1975 |

(Continued)

OTHER PUBLICATIONS

International Search Report dated Nov. 29, 2016 in International (PCT) Application No. PCT/JP2016/004085.
(Continued)

*Primary Examiner* — Sherrie Hsia
(74) *Attorney, Agent, or Firm* — Wenderoth, Lind & Ponack, L.L.P.

(57) ABSTRACT

A projection system includes an invisible light projector, an imaging unit, an image generator, and a visible light projector. The invisible light projector projects a predetermined invisible light image onto the object via invisible light. The imaging unit captures an image of the invisible light projected from the invisible light projector. The image generator measures a shape of the object based on the image captured by the imaging unit to generate image data showing image content for projection onto the object in accordance with the measured shape. The visible light projector projects the image content shown by the image data onto the object via visible light. The invisible light projector emits pulsed invisible light to project the measurement pattern. The image generator generates the image data based on an image captured in accordance with a timing for the pulsed light emission.

20 Claims, 10 Drawing Sheets

Related U.S. Application Data continuation of application No. 16/419,504, filed on May 22, 2019, now Pat. No. 10,554,939, which is a continuation of application No. 16/139,520, filed on Sep. 24, 2018, now Pat. No. 10,356,374, which is a continuation of application No. 15/873,283, filed on Jan. 17, 2018, now Pat. No. 10,110,864, which is a continuation of application No. 15/692,186, filed on Aug. 31, 2017, now Pat. No. 9,894,332, which is a continuation of application No. 15/440,178, filed on Feb. 23, 2017, now Pat. No. 9,807,356, which is a continuation of application No. PCT/JP2016/004085, filed on Sep. 7, 2016.

(58) Field of Classification Search
CPC .......... H04N 9/31; H04N 5/74; H04N 9/3185; H04N 9/3194; G01B 11/25; G03B 21/56; G03B 21/00; G03B 21/14; G09G 5/00

USPC ........ 348/744, 750, 755; 353/94, 82, 31, 48; 359/443, 448, 449, 460
See application file for complete search history.

(56) References Cited

U.S. PATENT DOCUMENTS

| | | |
|---|---|---|
| 2015/0348313 A1 | 12/2015 | Fuchikami et al. |
| 2016/0054118 A1 | 2/2016 | Fuchikami |
| 2016/0088275 A1 | 3/2016 | Fuchikami |

FOREIGN PATENT DOCUMENTS

| | | |
|---|---|---|
| JP | 7-286858 | 10/1995 |
| JP | 2003-149717 | 5/2003 |
| JP | 2005-148298 | 6/2005 |
| JP | 2006-337309 | 12/2006 |
| JP | 2012-163371 | 8/2012 |
| JP | 2013-124941 | 6/2013 |
| JP | 2015-148585 | 8/2015 |
| JP | 2015-173431 | 10/2015 |
| JP | 2015-180857 | 10/2015 |
| WO | 2015/125401 | 8/2015 |

OTHER PUBLICATIONS

Extended European Search Report dated Feb. 11, 2019 in European Application No. 16836144.2.
English translation of International Preliminary Report on Patentability dated Dec. 20, 2018 in International (PCT) Application No. PCT/JP2016/004085.

FIG. 3A
IMAGE DATA OF MEASUREMENT PATTERNS
FIG. 3B
CAPTURED IMAGE OF MEASUREMENT PATTERNS
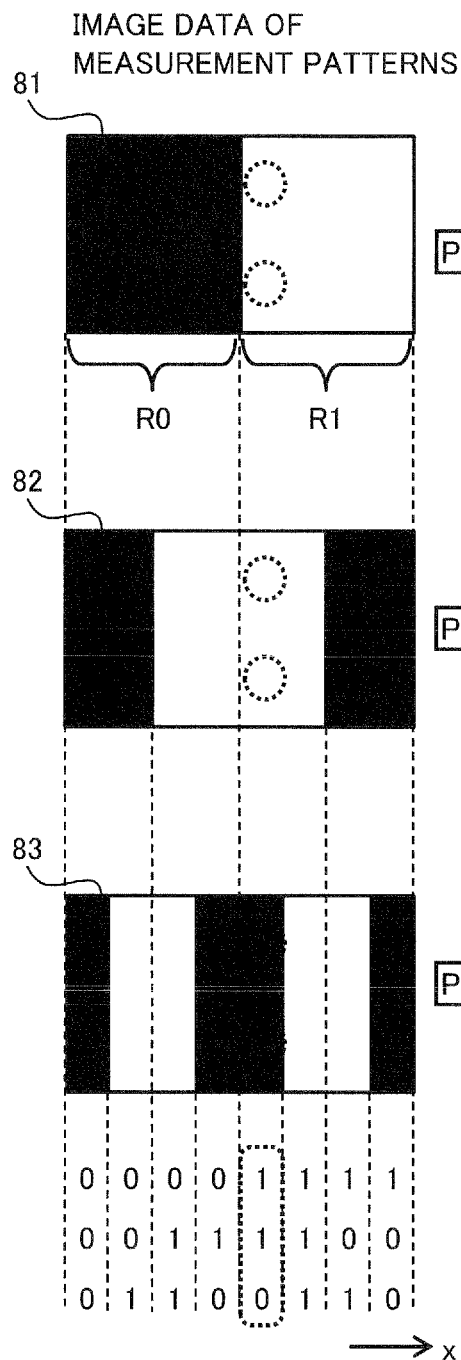
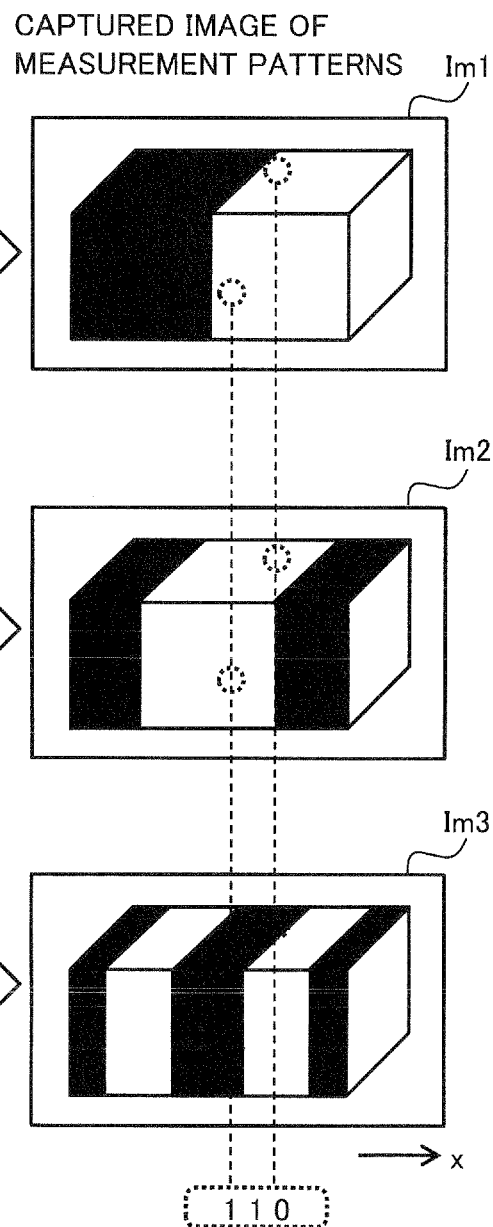

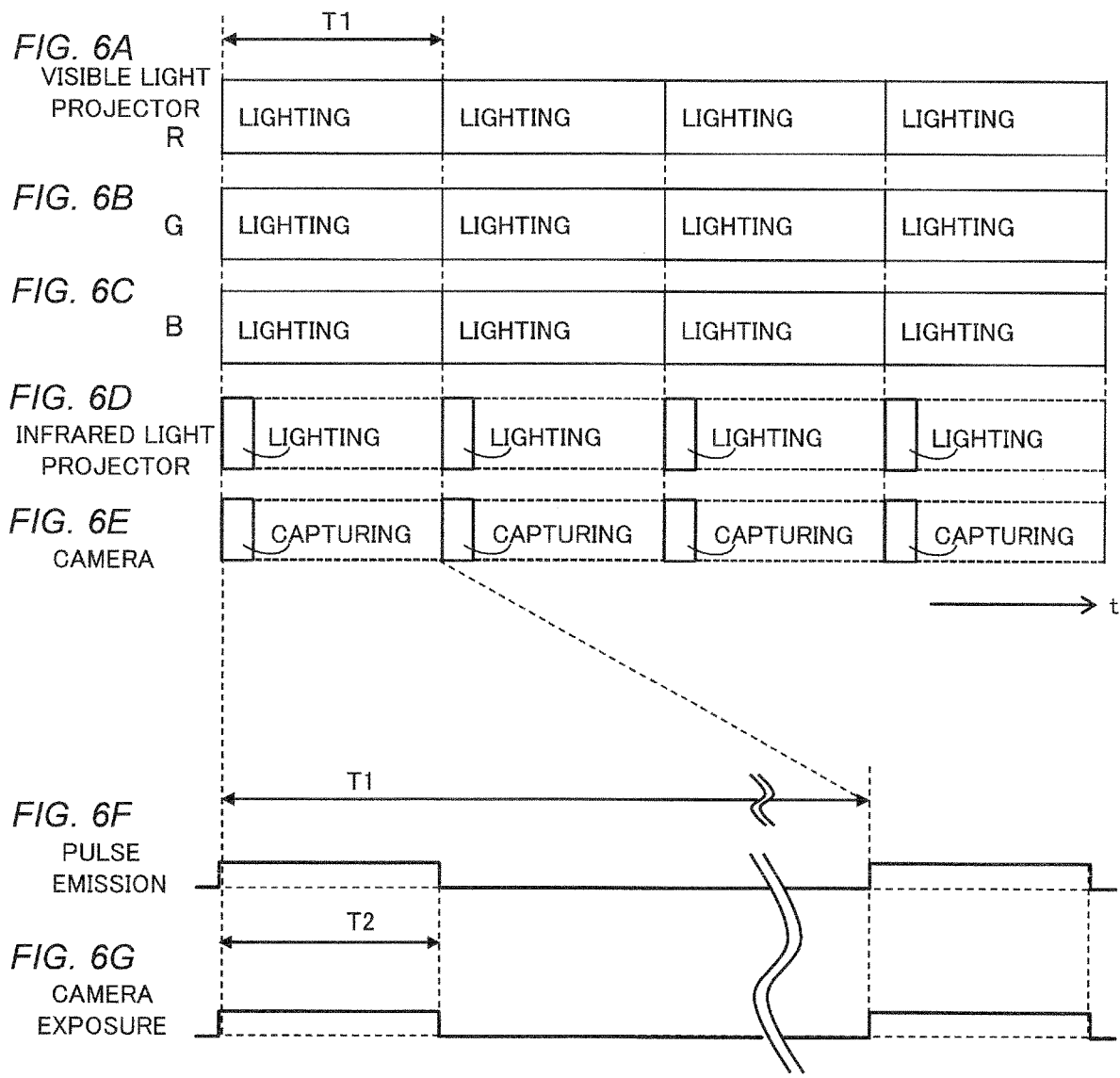

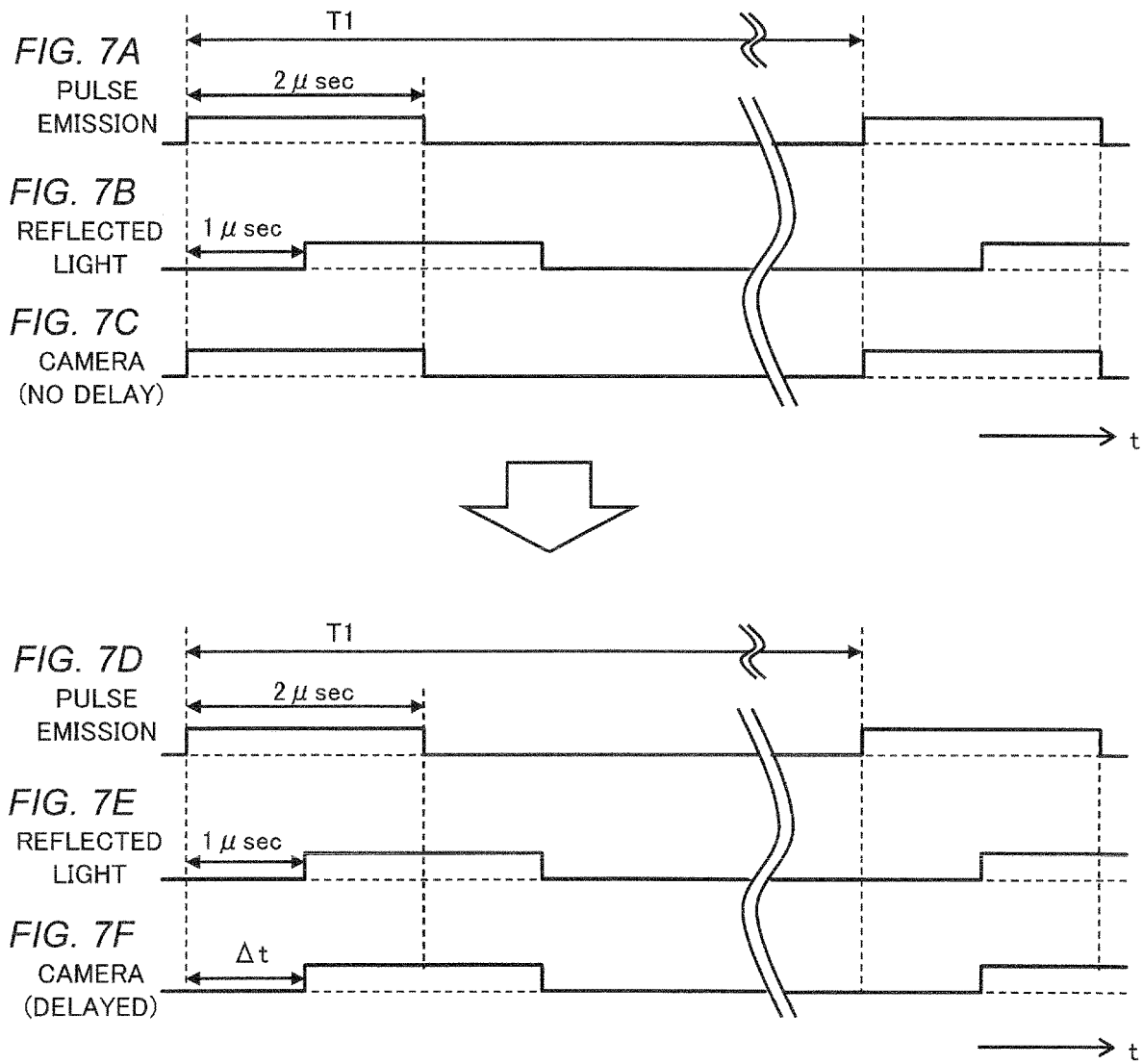

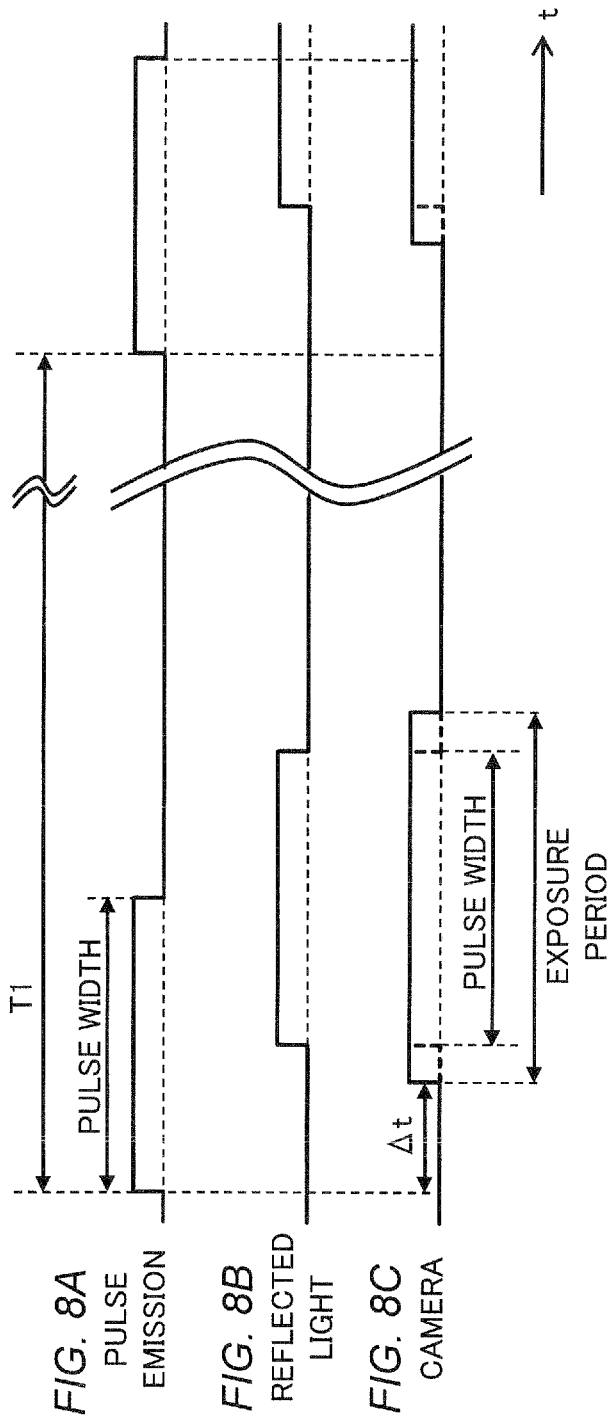

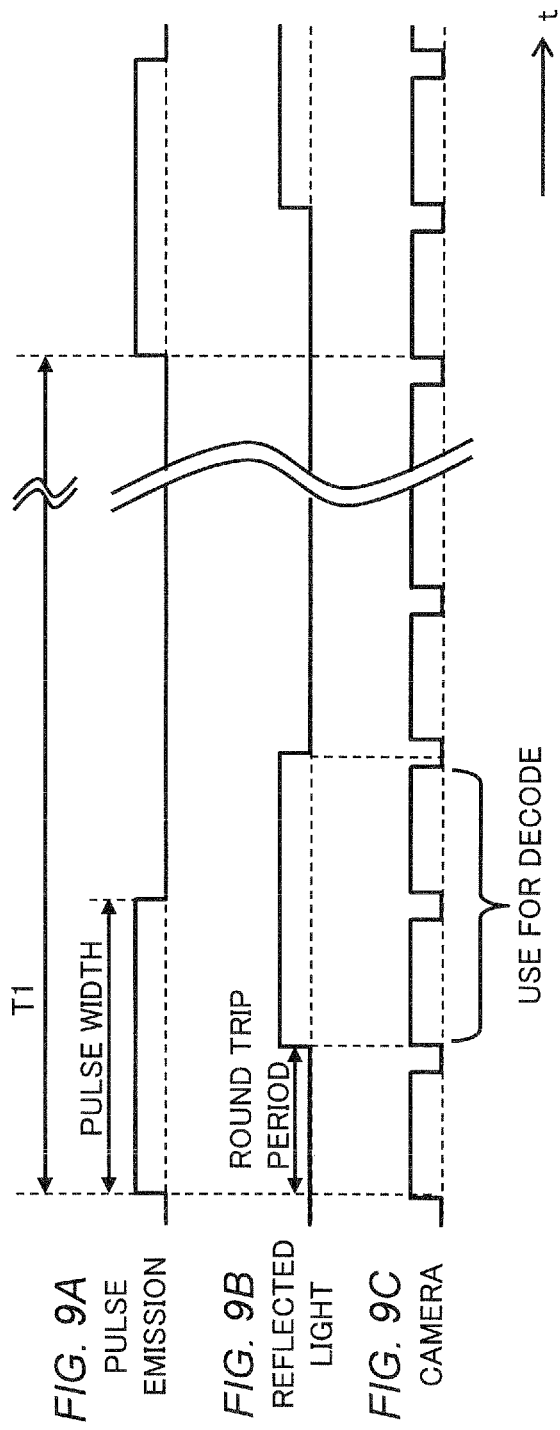

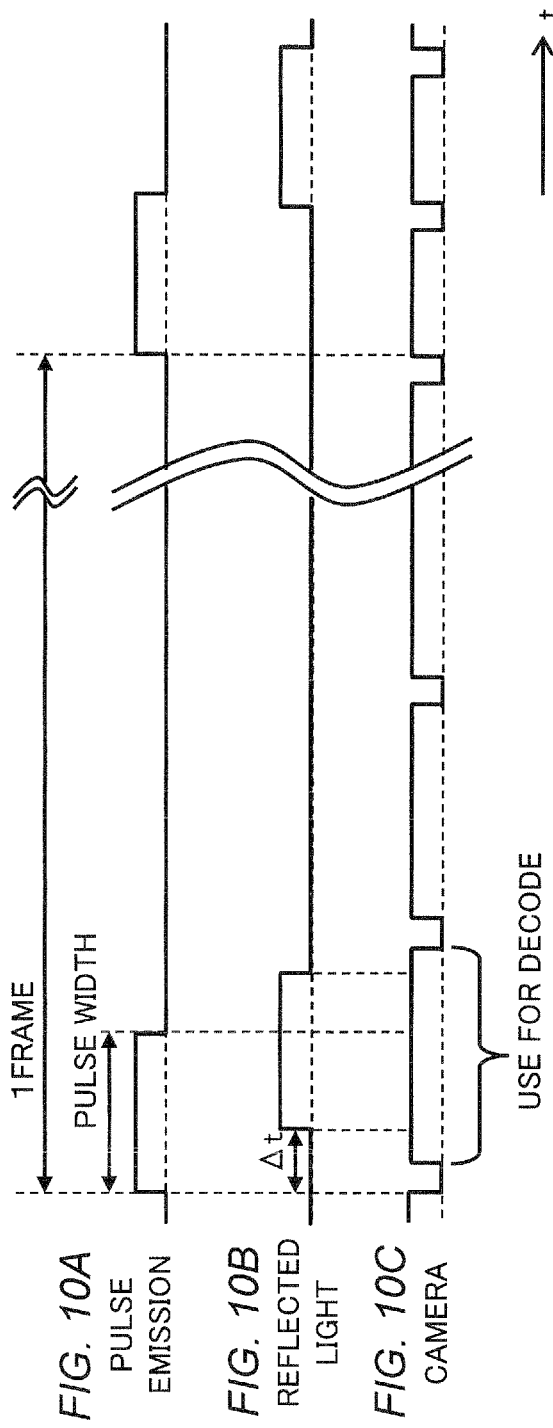

PROJECTION SYSTEM

This application is a continuation of application Ser. No. 16/718,863, filed Dec. 18, 2019, now U.S. Pat. No. 10,999,564 which is a continuation of application Ser. No. 16/419,504, filed May 22, 2019, now U.S. Pat. No. 10,554,939 which is a continuation of application Ser. No. 16/139,520, filed Sep. 24, 2018, now U.S. Pat. No. 10,356,374 which is a continuation of application Ser. No. 15/873,283, filed Jan. 17, 2018, now U.S. Pat. No. 10,110,864, which is a continuation of application Ser. No. 15/692,186, filed Aug. 31, 2017, now U.S. Pat. No. 9,894,332, which is a continuation of application Ser. No. 15/440,178, filed on Feb. 23, 2017, now U.S. Pat. No. 9,807,356, which is a continuation of Application No. PCT/JP2016/004085, filed Sep. 7, 2016, which claims priority to Japanese Application No. 2016-114409, filed Jun. 8, 2016.

BACKGROUND

1. Technical Field

The present disclosure relates to a projection system for projecting an image fit for a shape, a position, and the like of an object.

2. Related Art

Japanese Laid-Open Patent Publication No. 2015-173431 discloses a projection system for projection mapping to project image content onto a structure such as a building. In the projection system, a projection apparatus radiates, onto the structure, image light showing image content and pattern light showing a pattern image in which projection coordinates in a projection coordinate system are coded. Further, a capture apparatus captures an image of the pattern image projected onto the structure. The projection system enables projection mapping while the image content is positioned for the structure.

SUMMARY

The present disclosure provides a projection system that projects an image fit for a shape of an object and that is capable of measuring the shape of the object with a high degree of precision.

A projection system according to the present disclosure projects an image fit for a shape of an object. The projection system includes an invisible light projector, an imaging unit, an image generator, and a visible light projector. The invisible light projector projects a predetermined invisible light image onto the object via invisible light. The imaging unit captures an image of the invisible light projected from the invisible light projector. The image generator measures a shape of the object based on the image captured by the imaging unit to generate image data showing image content for projection onto the object in accordance with the measured shape. The visible light projector projects the image content shown by the image data onto the object via visible light. The invisible light projector emits pulsed invisible light to project the measurement pattern. The image generator generates the image data based on an image captured in accordance with a timing for the pulsed light emission.

According to the present disclosure, the projection system, which projects the image fit for the shape of the object, is capable of measuring the shape of the object with the high degree of precision.

BRIEF DESCRIPTION OF DRAWINGS

FIGS. 3A and 3B are drawings for illustrating measurement patterns in accordance with a space encoding method.

FIGS. 6A to 6G are timing charts showing timings for operation of the projection system according to the first embodiment.

FIGS. 7A to 7F are timing charts showing timings for operation of a projection system according to a second embodiment.

FIGS. 8A to 8C are timing charts showing timings for operation of a projection system according to a variant example of the second embodiment.

FIGS. 9A to 9C are timing charts showing timings for operation of a projection system according to a third embodiment.

FIGS. 10A to 10C are timing charts showing timings for operation of a projection system according to a variant example of the third embodiment.

DESCRIPTION OF EMBODIMENTS

Embodiments of the present disclosure will now be described in detail with reference to the accompanying drawings. However, description in more detail than is necessary can be omitted. For example, detailed descriptions of well-known matters and redundant descriptions of substantially identical constituent elements are omitted so as to avoid unnecessarily redundant description and enable those of skill in the art to readily understand the embodiments herein.

The applicant has provided the accompanying drawings and description below to allow those of skill in the art to satisfactory understand the present disclosure. Accordingly, these examples should not be construed as limiting the spirit and scope of the claims.

First Embodiment

1. Configuration

Figure 1:
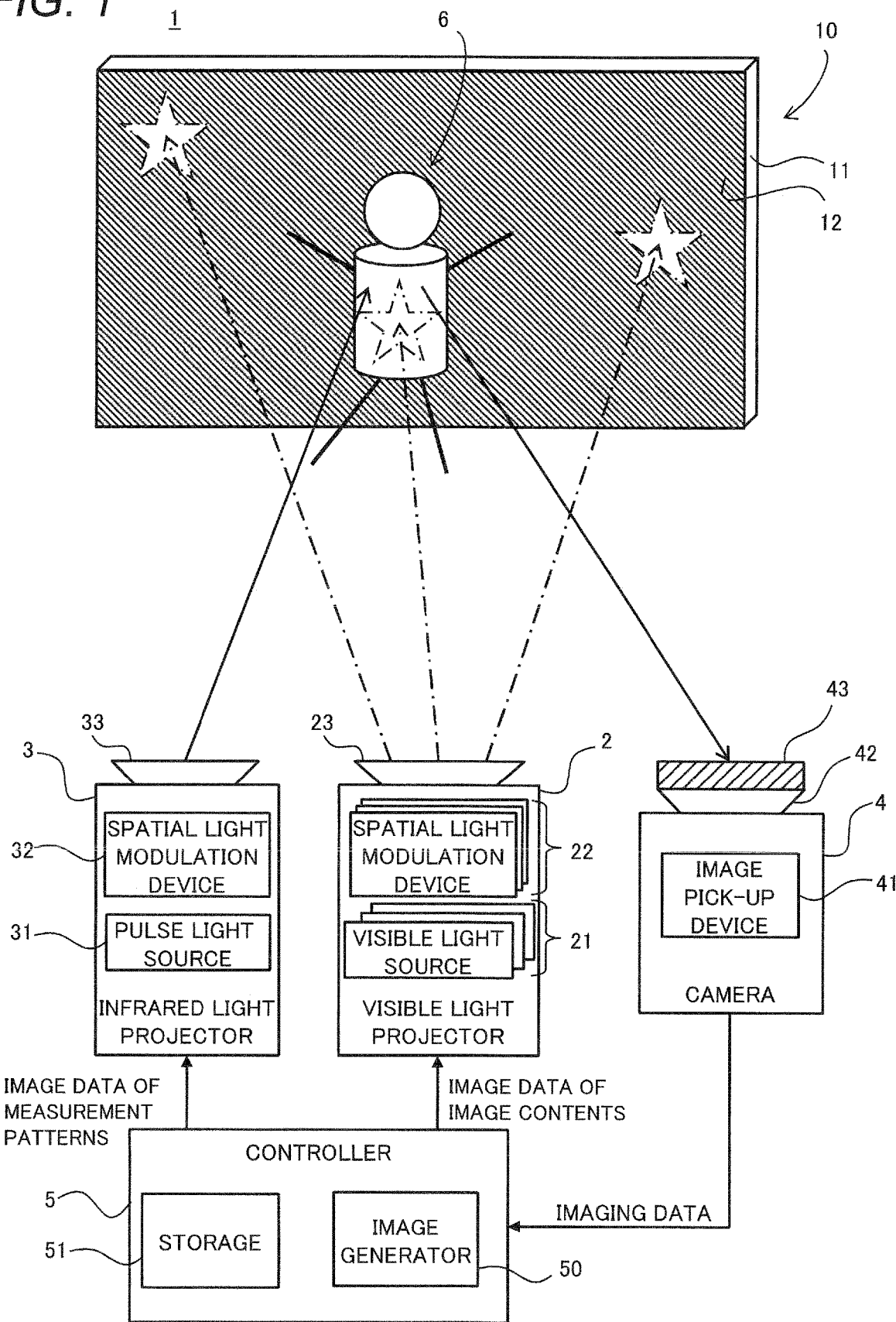
FIG. 1 is a block diagram showing a configuration of a projection system according to a first embodiment.

With reference to FIG. 1, a projection system configuration according to a first embodiment will now be described. FIG. 1 is a block diagram showing a configuration of a projection system 1 according to this embodiment.

As shown in FIG. 1, the projection system 1 includes a visible light projector 2, an infrared light projector 3, a camera 4, a controller 5, and a screen 10. The projection system 1 according to this embodiment is a projection mapping system for projecting visible light images on a subject 6 such as a person or the like for staging for example. In the projection system 1, the infrared light projector 3 and the camera 4 is used for measuring a shape and the like of the subject 6 in order to get visual light image content from the projector 2 to follow the motion of the subject 6. The screen 10 is disposed behind the subject 6 in projecting directions of the projectors 2 and 3.

The visible light projector 2 is a projector using DLP, 3LCD, or LCOS technology, for example. The visible light projector 2 emits visible rays to project an image containing various image contents, based on image signals (image data) received from the controller 5, for example. The visible light projector 2 is an exemplary visible light projector in accordance with this embodiment. As shown in FIG. 1, the visible light projector 2 includes a visible light source 21, a spatial light modulator 22, and a projection optical system 23.

In this embodiment, the visible light source 21 includes a plurality of luminous elements (e.g. LEDs) emitting red, green, and blue rays of light, respectively. The visible light source 21 may include a sole monochrome luminous element or a white color luminous element appropriately depending on a projection method adopted for the visible light projector 2. The luminous elements may be laser diodes, halogen lamps or the like.

The spatial light modulator 22 includes three spatial light modulation devices in this embodiment. The spatial light modulation devices can be DMD or LCD chips, or the like. The spatial light modulator 22 may be a single spatial light modulation device.

The projection optical system 23 includes a zoom lens for defining an angle of view for the visible light projector 2, and a focus lens for focus adjustment.

The infrared light projector 3 is a projector using DLP, LCD, or LCOS technology, for example. The infrared light projector 3 projects predetermined infrared measurement patterns described later on the basis of image signals (image data) received from the controller 5, for example. The infrared light projector 3 is an exemplary invisible light projector that projects invisible light images using invisible light. In this embodiment, the infrared light is used as an instance of invisible light. Any other invisible light may be used, e.g. ultraviolet light.

With reference to FIG. 1, the infrared light projector 3 includes a pulse light source 31, a spatial light modulation device 32, and a projection optical system 23.

In this embodiment, the pulse light source 31 includes a pulse laser device that emits infrared light in oscillating pulses. Based on the oscillating pulses, the pulse light source 31 emits pulsed infrared light with a pulse width of 0.1 picoseconds to 20 microseconds and a peak wavelength of 800 nm to 900 nm, for example.

The spatial light modulation device 32 is a DMD or LCD chip, or another device. The spatial light modulation device 32 forms an image on an image formation surface thereof based on image signals from the controller 5 or the like. The pulse of infrared light emitted from the pulse light source 31 enters the image formation surface of the spatial light modulation device 32 such that the infrared light is spatially modulated and an invisible light image is produced.

The projection optical system 33 includes a zoom lens for defining an angle of view for the infrared light projector 3, and a focus lens for focus adjustment.

The projectors 2 and 3 are disposed such that they can emit their rays of light into an identical area with each other, for example. The projectors 2 and 3 may be optically coupled each other such that their optical axes align with each other. In this case, a dichroic mirror or the like can be used, which passes visible light with infrared light reflected or which reflects visible light with infrared light passed. Further, in this case, the projection optical systems 23 and 33 may be integrated each other. Furthermore, the infrared light projector 3 and the visible light projector 2 may be integrated each other a single instrument.

The camera 4 is disposed at a position that allows the camera 4 to capture an image of an area into which invisible light images are projected from the infrared light projector 3. The camera 4 generates a capture image of a measurement pattern that is projected onto the subject 6 through infrared light. The camera 4 outputs imaging data, which is data showing the capture image, to the controller 5. The camera 4 is an exemplary imaging unit in the projection system 1. With reference to FIG. 1, the camera 4 includes an image pick-up device 41, an imaging lens 42, and a visible light shielding filter 43.

The image pick-up device 41 includes a solid-state image sensing device, e.g. a CCD or CMOS image sensor made primarily from silicon. The image pick-up device 41 has an imaging surface that contains a plurality of arranged pixel circuits for receiving light. The principal material used for the image pick-up device 41 may be any material, such as germanium or gallium, other than silicon.

The imaging lens 42 includes a zoom lens for defining an angle of view for the camera 4, and a focus lens for focus adjustment.

The visible light shielding filter 43 is a bandpass filter or a long-pass filter which transmits infrared light components and absorbs visible light components of incident light. The visible light shielding filter 43 is attached to the imaging lens 42, for example. The visible light shielding filter 43 is an exemplary wavelength selector used for the camera 4 to selectively transmit infrared light.

The visible light shielding filter 43 may be integrated with the imaging lens 42 through means such as forming a coating or a diffraction grating on the imaging lens 42. Alternatively, the visible light shielding filter 43 may be built into an image formation surface or any other part of the image pick-up device 41. The visible light shielding filter 43 may be configured to reflect visible light components in place of or in addition to absorbing visible light components.

The controller 5 is a control device for controlling the above components of the projection system 1. The controller 5 includes a CPU or an MPU to implement predetermined functions in collaboration with software, for example. With reference to FIG. 1, the controller 5 includes an image generator 50 and a storage 51.

The controller 5 reads data and programs stored in the storage 51 to perform various arithmetic operations and realize functions of every kind. For example, the controller 5 implements functions required for the image generator 50. The controller 5 may control timings for acts performed by the components such as the camera 4, the infrared light projector 3, and the visible light projector 2 (e.g. control for synchronization between the components), as well as perform zoom control, focus control, and other control.

The controller 5 may be a hardware circuit such as an electronic circuit specifically designed for implementing predetermined functions, or a reconfigurable electronic circuit. The controller 5 may include any of semiconductor integrated circuits, such as CPUs, MPUs, microcontrollers, DSPs, FPGAs, and ASICs. The functions of the controller 5 may be built into the respective components 2, 3, and 4 of the projection system 1.

The image generator 50 generates image data showing image content to be projected by the visible light projector 2. The image data is required to be generated so that its projection enables the image content to follow the motion of the subject 6. To this end, the image generator 50 performs three-dimensional measurement for a shape of the subject 6 and the like based on the imaging data received from the camera 4. Operation of the image generator 50 will be described later.

The storage 51 is a storage medium for storing programs and data needed to implement functions of the controller 5.

The storage 51 includes a hard disk drive (HDD)) or a solid state disk (SSD), for example. The storage 51 may further include DRAM, SRAM, or any other semiconductor device so as to store data temporarily and act as a workspace for the controller 5. For, example, the storage 51 stores image data for image content of various kinds and image data for measurement patterns described later.

The screen 10 is an exemplary background member for showing image content which constitutes a background for the subject 6 in the projection system 1. The screen 10 enables projection of image content in conjunction with the motion of the subject 6 and enhances stage effect produced by projection mapping, for example. With reference to FIG. 1, the screen 10 includes a diffusion member 11 and an infrared light shielding filter 12.

The diffusion member 11 is a screen curtain having a projection surface for diffusely reflecting visible light. The screen 10 has a two-layer structure in which the diffusion member 11 is covered with the infrared light shielding filter 12 (refer to FIG. 4). The projection surface provided for the screen 10 may be flat or curved.

The infrared light shielding filter 12 includes a film that possesses optical properties of transmitting visible light components of incident light at an average of 50% or more and absorbing infrared light components of the incident light at an average of 50% or more. The infrared light shielding filter 12 forms a light shielding surface for preventing incident infrared light from being diffusely reflected on the projection surface of the screen 10. The infrared light shielding filter 12 is an exemplary light shielding member for use in the screen 10.

Not limited to the above optical properties, the infrared light shielding filter 12 may possess an optical property of specular reflection of infrared light, for example. Alternatively, the infrared light shielding filter 12 may have a retroreflective structure containing beads or other materials, for example. The infrared light shielding filter 12 may be made up of a panel, for example, other than the film. Alternatively, the infrared light shielding filter 12 may be formed by means such as application of a coating to the diffusion member 11.

2. Operation

Operation of the projection system 1 having the configuration described above will now be described.

2-1. Projection Operation (Projection Mapping)

With reference to FIG. 1, projection operation of the projection system 1 for performing projection mapping according to this embodiment will be described.

The infrared light projector 3 emits infrared light to project, onto the subject 6, each measurement pattern in a plurality of measurement patterns sequentially. The measurement patterns are exemplary invisible light images for measurement of a shape and sites of the subject 6 by the use of a space encoding method. Shapes subject to measurement are three-dimensional shapes including contours and asperities of an object like the subject 6. Sites subject to measurement are three-dimensional sites including distance to the object. The principle of three-dimensional measurement will be described later.

The infrared light projector 3 reads image data stored in the storage 51 and forms each measurement pattern shown by the image data at the spatial light modulation device 32 under control of the controller 5, for example. Then, the infrared light projector 3 drives the pulse light source 31 to project the measurement pattern using infrared light at an angle of view including a range such as the entire projection surface of the screen 10.

The camera 4 captures the measurement pattern projected by the infrared light projector 3 and outputs imaging data showing an image of the captured measurement patterns to the controller 5. The capture operation by the camera 4 is performed for each of the measurement patterns.

The image generator 50 of the controller 5 measures a shape and sites of the subject 6 based on the images of the captured measurement patterns, and generates image data that contains image content for projection onto to the subject 6 according to the measured results.

Specifically, the image generator 50 obtains distances from the own device for each pixel on a region of the subject 6 in the captured patterns image by using a space encoding method described later, and produces a distance image that shows the obtained distances to the respective pixels. Based on the produced distance image, the image generator 50 corrects default image data so that image content specified by the default image data is appropriately shown at the time of being projected to the subject 6 with the measured shape and sites. The default image data is in advance stored in the storage 51, for example.

In this embodiment, the image generator 50 also generates image data including image content for projection onto the screen 10 and outputs the image data to the visible light projector 2. The storage 51 stores in advance information showing a location and a form (orientation) of the screen 10 through calibration at the time of installation of the projection system 1 or other events, for example. With reference to the information described above, the image generator 50 corrects the image content for projection onto the screen 10 at the time of the projection operation.

On the basis of the image data from the image generator 50 of the controller 5, the visible light projector 2 controls the spatial light modulator 22 and emits visible light from the visible light source 21 so as to project the image content onto the subject 6 and the screen 10.

The projection system 1 repeats the processing described above at a predetermined frame rate. This allows image content projected from the visible light projector 2 to follow the motion of the subject 6 with a high degree of precision.

In the projection operation of the projection system 1 described above, improving the accuracy in measurement of a shape and sites of the subject 6 based on the captured images of measurement patterns projected by the infrared light projector 3 is important. To achieve the objective of improving the measurement accuracy described Above, the present embodiment uses the filters 12 and 43. To achieve the objective described above, the present embodiment also adopts pulsed light emission control for the infrared light projector 3. Operation of the projection system 1 according to this embodiment will now be described in detail.

2-2. Theory of Three-Dimensional Measurement

Figure 2:
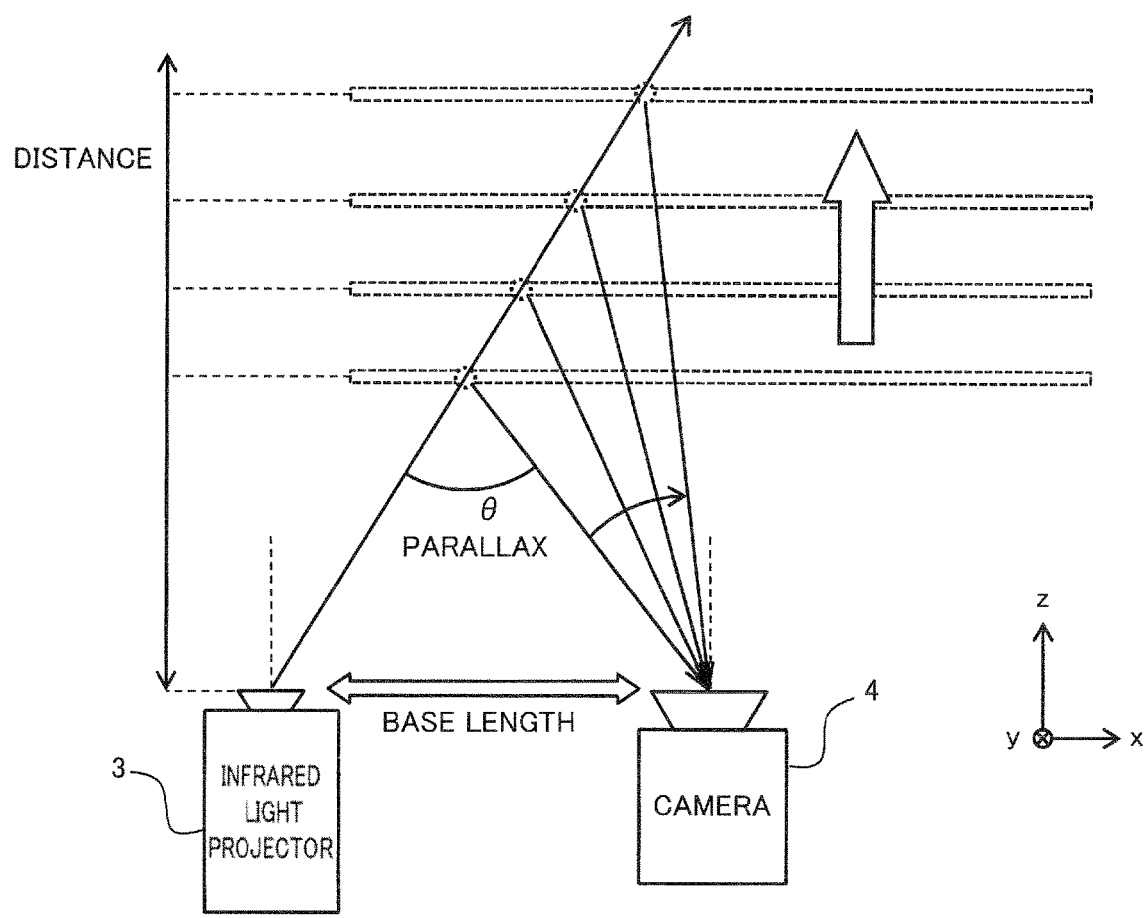
FIG. 2 is a drawing for illustrating a theory of three-dimensional measurement used in the projection system.

The present embodiment adopts space encoding method-based active stereo measurement as a theory of measuring a shape and the like of the subject 6. The theory of this measurement will now be described with reference to FIGS. 2, 3A, and 3B. FIG. 2 is a drawing for illustrating the theory of three-dimensional measurement. FIGS. 3A and 3B are drawings for illustrating measurement patterns in accordance with the space encoding method.

In FIG. 2, the camera 4 and the infrared light projector 3 are alongside disposed such that their respective optical axes are parallel to each other. Hereinafter, the direction of these optical axes is defined as the z direction as shown in FIG. 2. A direction that is perpendicular to the z direction and along which the camera 4 and the infrared light projector 3 are aligned each other is defined as the x direction. A direction perpendicular to the z and x directions is the y direction.

FIG. 2 shows a ray of infrared light emitted from the infrared light projector 3 being reflected off a certain point (a luminous point) of an object and the light reflected from the luminous point being incident on the camera 4. With reference to FIG. 2, a parallax θ occurs between the camera 4 and the infrared light projector 3. When the camera 4 captures an image projected from the infrared light projector 3, the image captured by the camera 4 contains the projected image at a displacement of the parallax θ. In other words, the x coordinate of a luminous point of the object on the image captured by the camera 4 varies with distance to the luminous point, as shown in FIG. 2.

In the projection system 1, the controller 5 (the image generator 50) performs a calculation based on the coordinate variation described above to measure distance in the z direction by using a trigonometric approach in which the interval between the camera 4 and the infrared light projector 3 is taken as a base length. The base length is obtained in advance through calibration at the time of installation of the projection system 1 or other events, for example. The coordinate variation is determined using measurement patterns in accordance with the space encoding method. A method of this determination will now be described with reference to FIGS. 3A and 3B.

FIG. 3A illustrates image data showing a set of measurement patterns 81, 82, and 83 projected from the infrared light projector 3. The measurement patterns 81, 82, and 83 each include at least one luminous region R1 and at least one non-luminous region R0 that are disposed along a direction of the x coordinate subject to determination of variation. According to the space encoding method, the x coordinate on image data is coded by the correspondence of the luminous region R1 to "1" and the non-luminous region R0 to "0". In the illustration of FIG. 3A, the three measurement patterns 81, 82, and 83 generate 3-bit codes that correspond to eight regions on the image data.

FIG. 3B illustrates captured images Im1, Im2, and Im3 that are generated when the camera 4 captures the object after projection of the measurement patterns 81, 82, and 83 of FIG. 3A onto the object. As shown in FIG. 3B, the x coordinate of luminous points of the object on the captured images varies with the depth dimension on the object even if the luminous points are associated with an identical code "110". In this embodiment, the controller 5 determines the coordinate variation by decoding imaging data showing the captured images Im1, Im2, and Im3 at the image generator 50.

Specifically, the controller 5 performs threshold judgement for each pixel in one frame of a captured image by comparing the brightness of the pixel with a predetermined threshold. The predetermined threshold is a reference threshold value for determining pixels in the captured image in which the pixels reflect luminous points as luminous regions in the measurement pattern. For example, the threshold value is set in consideration of the amount of noise light. In the threshold judgement, the controller 5 assigns "1" to the pixel determined that the brightness exceeds the threshold, and "0" to the pixel determined that the brightness does not exceed the threshold.

The controller 5 performs the processing described above on all the captured images Im1, Im2, and Im3. The controller 5 decodes the imaging data by compiling two values ("0" or "1") assigned to the pixels each. At this time, the controller 5 may extract a region corresponding to the subject from the imaging data, for example, by removing regions in which the brightness of each pixel does not exceed the threshold from all the captured images Im1, Im2, and Im3.

The controller 5 determines x coordinate variation by comparing the x coordinate value derived from the decoded result with the reference x coordinate value for every pixel. The controller can determine y coordinate variation as well in like manner with the description above, for example, by using measurement patterns that are obtained through a 90-degree rotation of the measurement patterns 81, 82, and 83 of FIG. 3A. If a parallax occurs between the infrared light projector 3 and the visible light projector 2 as well, the controller obtains information showing installation locations of the two projectors in advance and converts three-dimensional coordinates defined for the infrared light projector 3 into three-dimensional coordinates defined for the visible light projector 2 as appropriate, for example.

2-3. Filters

Figure 4:
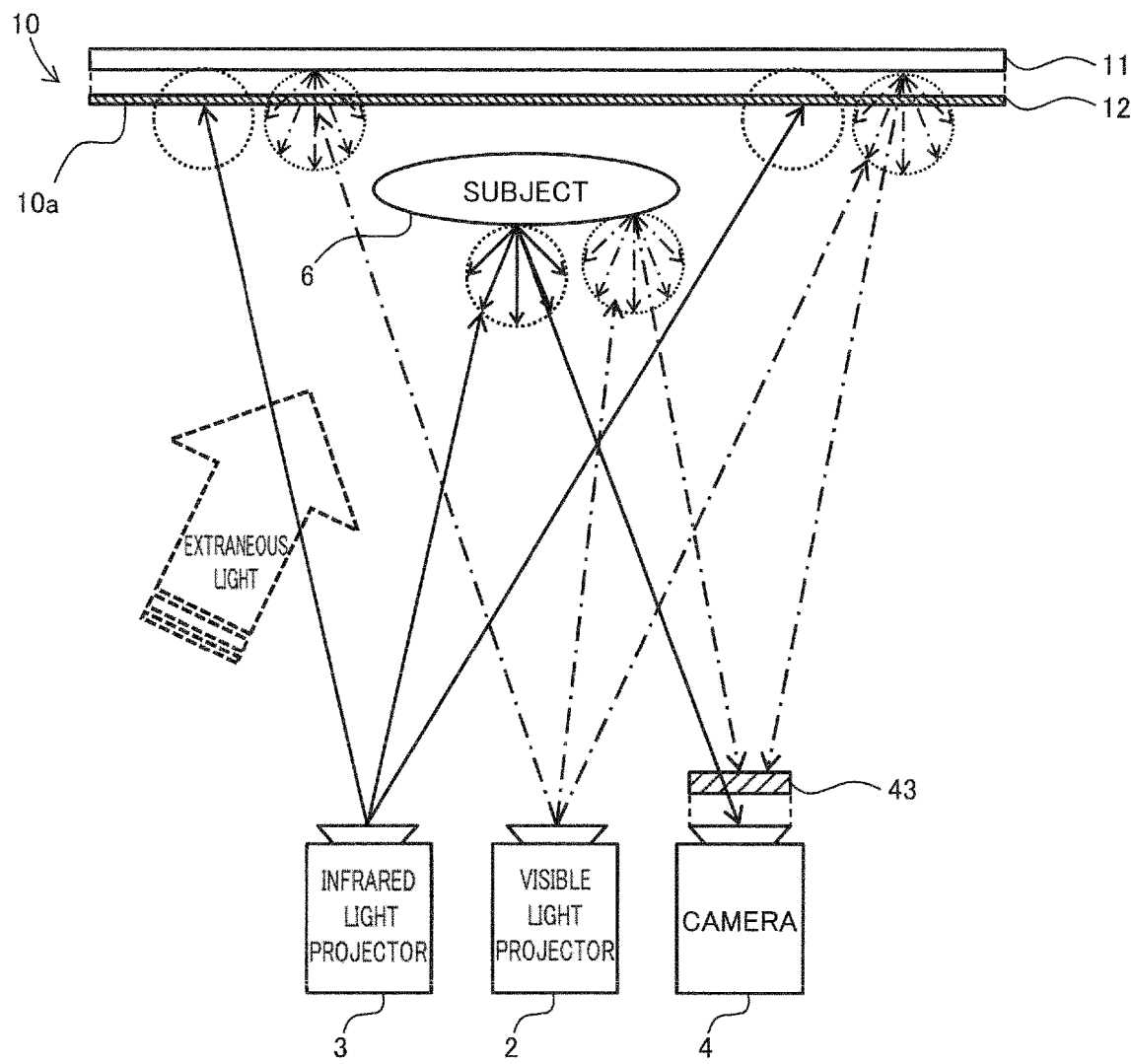
FIG. 4 is a drawing for illustrating functions of filters of the projection system.

With reference to FIG. 4, functions of the infrared light shielding filter 12 and the visible light shielding filter 43 according to this embodiment will be described. FIG. 4 is a drawing for illustrating functions of these filters of the projection system 1.

In this embodiment, the visible light projector 2 projects image content onto the screen 10 as well as the subject 6 (refer to FIG. 1). In order to enable viewers or the like to visually identify image content projected on the screen 10, the visible light from the visible light projector 2 needs to be diffusely reflected on the screen 10 as shown in FIG. 4. Meanwhile, if the infrared light from the infrared light projector 3 is also diffusely reflected on the screen 10, the boundary between a region of the subject 6 and the other region in measurement pattern images captured with the camera 4 will be indistinct.

To address this problem, the screen 10 of this embodiment includes the infrared light shielding filter 12 for preventing diffuse reflection of the infrared light on the projection surface of the screen 10 (see FIG. 4). As a result, out of the measurement pattern projected from the infrared light projector 3, a projected part onto the screen 10 does not appear in an image captured with the camera 4, but a residual part projected onto the subject 6 just appears in the captured image. This configuration makes an outline of the subject 6 distinct in the captured image by the camera 4 and thereby enables the determination of a shape and sites of the subject 6 with a high degree of precision.

The screen 10 includes the diffusion member 11 for diffusely reflecting visible light and the infrared light shielding filter 12 that covers the diffusion member 11. With reference to FIG. 4, the infrared light shielding filter 12 transmits visible light so as to keep the diffuse reflection of visible light on the projection surface of the screen 10. This configuration allows the screen 10 to ensure visibility of images projected from the visible light projector 2.

With reference to FIG. 4, the camera 4 of this embodiment is provided with the visible light shielding filter 43 that cuts off visible light components and transmits infrared light components of light entering the camera 4. This configuration allows the camera 4 to capture the measurement pattern projected from the infrared light projector 3 with a high degree of precision regardless of timing when the visible light projector 2 emits visible light for projecting an image.

Other than absorption of infrared light, prevention of diffuse reflection at a light shielding surface 10a of the screen 10 may be achieved by any process such as specular reflection or retroreflection of infrared light at the infrared light shielding filter 12. When specular reflection is employed, the captured image may include a light source image of the infrared light projector 3 with the light shielding surface 10a acting as a mirror plane. In this case, the controller 5 may determine a region of the light source image in the captured image based on light quantity, location, or the like to remove the light source image, for example. When retroreflection is employed, the filter reflects infrared light emitted from the infrared light projector 3 toward the infrared light projector 3 and thus prevents the light from entering the camera 4.

2-4. Pulsed Light Emission Control

Figure 5:
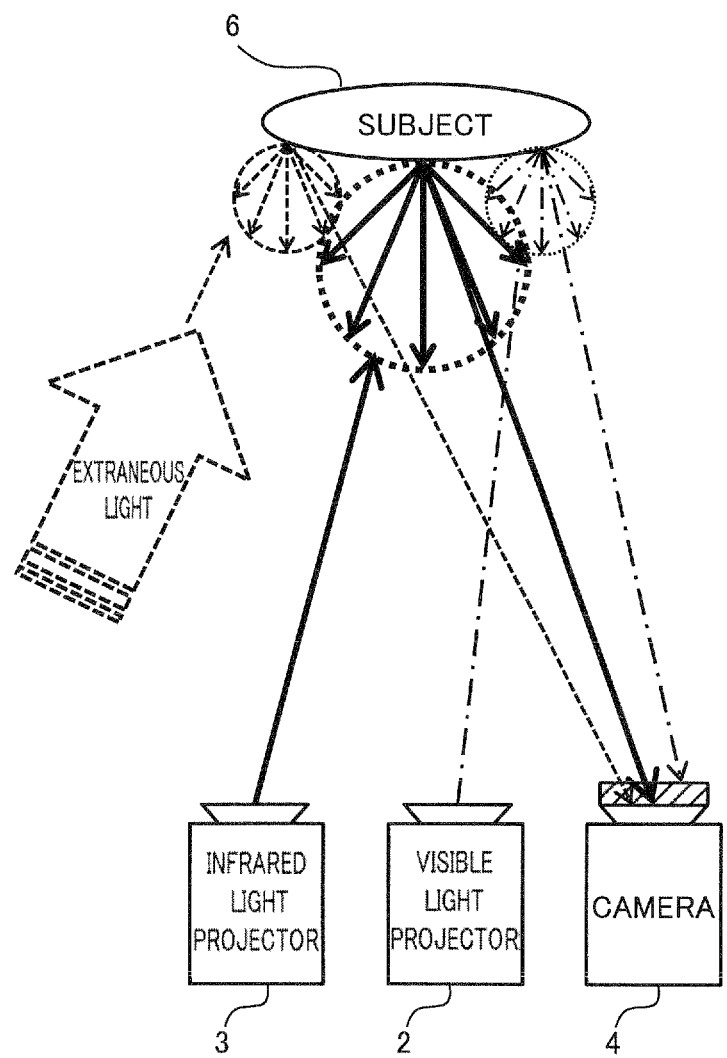
FIG. 5 is a drawing for illustrating a function of pulsed light emission control in the projection system.

With reference to FIG. 5, pulsed light emission control for the measurement patterns according to this embodiment will now be described. FIG. 5 is a drawing for illustrating a function of pulsed light emission control in the projection system 1.

With reference to FIG. 5, rays of light reflected on the subject 6 include infrared light from the infrared light projector 3, as well as visible light from the visible light projector 2 and extraneous light. Extraneous light typically includes visible light components and infrared light components. When the camera 4 is exposed with the reflected rays of light other than infrared light from the infrared light projector 3, these rays of light causes noise that decreases the accuracy in measurement of the subject 6 on the basis of captured images.

To address this problem, the pulse light source 31 (FIG. 1) of the infrared light projector 3 according to this embodiment projects the measurement pattern by emitting pulsed infrared light such that the emitted infrared light is quantitatively concentrated for a duration of a pulse width (FIG. 5). The camera 4 captures an image in synchronization with timing for emission of a pulse of infrared light. According to this configuration, in the total amount of light exposure by the camera 4, a share of the infrared light emitted from the infrared light projector 3 can be significantly larger than other share of the noise such as the extraneous light. This leads to an improved signal-to-noise ratio in the accuracy of measurement of the subject 6. Further, mitigated effects of extraneous light on the measurement accuracy contribute to increased flexibility in installation of the projection system 1.

With reference to FIGS. 6A to 6G, a timing for control of the projection system 1 according to this embodiment will now be described in detail.

FIGS. 6A, 6B, and 6C illustrate respective timings of red light (R), green light (G), and blue light (B) emitted by the visible light projector 2. With reference to FIGS. 6A to 6C, the visible light projector 2 of this embodiment drives the visible light source 21 (FIG. 1) so as to emit red, green, and blue light each continuously during a frame period T1 for projection of one frame of an image. As a result, the amount (the maximum amount) of red, green, and blue light can be set to a larger value than those set in cases where these colors of light are emitted in timeshared systems, and thus projected images can be made high quality, for example. The frame period T1 is set to 1/200 second or smaller, for example, to allow an image to follow a moving subject.

FIG. 6D illustrates a timing of infrared light emitted by the infrared light projector 3. With reference to FIG. 6D, the infrared light projector 3 periodically emits pulsed infrared light with the timing superposed on the period for light emission by the visible light projector 2. As a result, the respective amounts of visible and infrared light can be set to larger values than those set in cases where these types of light are emitted in timeshared systems, for example.

In this embodiment, the infrared light projector 3 projects one frame of a measurement pattern per one pulsed light emission, for example. The length of a pulse cycle, i.e. a repetition period for pulsed light emission, is set to a length identical to the frame period T1 for the visible light image. The amount of infrared light emitted per one pulsed light emission is set with reference to the amount of visible light allowed to be emitted by the visible light projector 2, for example, and can be set to an amount greater than or equal to the amount of visible light allowed to be emitted during the frame period T1 or the same period as a width of the pulse.

FIG. 6E illustrates a timing of image capture by the camera 4. At the image capturing, the camera 4 exposes in synchronization with the light-emitting timing of the infrared light projector 3, as shown in FIGS. 6D and 6E. This enables the camera 4 to capture an image every frame period T1. FIGS. 6F and 6G illustrate details about the frame period T1 of FIGS. 6D and 6E.

With reference to FIGS. 6F and 6G, the camera 4 of this embodiment exposes during a period T2, which has the same timing as the emission of pulsed measurement light and the same length as the pulse width. The pulse width of the emitted light pulse is set to a length of time between 0.1 picoseconds and 20 microseconds, for example. This configuration can make the peak amount of pulsed light emission significantly high while avoiding the occurrence of widening the wavelength band of measurement light due to an excessively shortened period for pulsed light emission. From a similar perspective, the duty ratio of the pulsed light emission is set to a value between 1/100 and 1/10000, for example. A pulse frequency associated with the pulse cycle may be set to somewhere between 200 Hz and 1 GHz as appropriate to ensure a frame rate of the captured image for following a moving subject.

3. Effects and the Like

As described above, the projection system 1 according to this embodiment projects an image fit for a shape of an object such as the subject 6. The projection system 1 includes the infrared light projector 3, the screen 10, the camera 4, the image generator 50, and the visible light projector 2. The infrared light projector 3 projects the measurement patterns 81 to 83 onto the object through invisible infrared light. The screen 10 is disposed behind the object in the direction of infrared light emitted from the infrared light projector 3. The camera 4 captures an image of the measurement patterns 81 to 83 projected from the infrared light projector 3. The image generator 50 measures a shape of the object based on the image captured by the camera 4 to generate image data showing image content for projection onto the object in accordance with the measured shape. The visible light projector 2 projects the image content shown by the image data onto the object via visible light. The screen 10 includes the light shielding surface 10a that does not diffusely reflect the infrared light incident thereon.

In the projection system 1 described above, the light shielding surface 10a prevents the infrared light emitted from the infrared light projector 3 from being diffusely reflected. This configuration enables the projection system 1 for projecting images according to object shapes to measure a shape of an object such as the subject 6 with a high degree of precision.

In this embodiment, the screen 10 absorbs infrared light at the light shielding surface 10a without diffuse reflection. The screen 10 may implement specular reflection or retroreflection without diffuse reflection. This mechanism prevents diffuse reflection of infrared light at the light shielding surface 10a and thus improves the accuracy of measurement of the object.

In this embodiment, the screen 10 diffusely reflects visible light. This enables the screen 10 to be projected images visibly from the visible light projector 2 and enhance stage effect produced by the projection system 1.

The screen 10 according to this embodiment includes the infrared light shielding filter 12 and the diffusion member 11. The infrared light shielding filter 12 constructs the light shielding surface 10a with the visible light transmitting. The diffusion member 11 is covered with the infrared light shielding filter 12, and diffusely reflects visible light. According to the two-layer structure of the diffusion member 11 and the infrared light shielding filter 12, the light shielding surface 10a capable of diffusely reflecting of visible light can be easily constructed.

In this embodiment, the camera 4 includes the silicon-containing image pick-up device 41 and the visible light shielding filter 43 that transmits infrared light and absorbs or reflects visible light. This configuration allows the camera 4 to cut off visible light even if the image pick-up device 41 has sensitivity to light in the visible spectrum. The visible light shielding filter 43 may be omitted in the case that an image pick-up device without sensitivity to light in the visible spectrum is used for example.

In this embodiment, the visible light shielding filter 43 is attached to the imaging lens 42 in the camera 4. The visible light shielding filter 43 may be a filter that is built into the image pick-up device 41 or that is integrated with the imaging lens 42 in the camera 4.

Further, the projection system 1 according to this embodiment includes the infrared light projector 3, the camera 4, the image generator 50, and the visible light projector 2. The infrared light projector 3 emits pulsed infrared light to project the measurement patterns 81, 82, and 83. The image generator 50 generates image data based on the images Im1, Im2, and Im3 captured in accordance with timings for each pulsed light emissions.

In the projection system 1 described above, the infrared light projector 3 projects the measurement patterns 81, 82, and 83 by emitting pulsed infrared light such that the emitted light is quantitatively concentrated for each period of the infrared light pulse width. This contributes to an improvement in the captured images Im1, Im2, and Im3 in terms of signal-to-noise ratio. This configuration enables the projection system 1 to measure a shape of an object like the subject 6 with a high degree of precision.

In this embodiment, the pulse width of the pulsed light emitted by the infrared light projector 3 is smaller than one frame period the projected image by the visible light projector 2. The amount of pulsed light emitted for a duration of the pulse width is larger than the amount of visible light emitted by the visible light projector 2 for the same duration.

As a result, the amount of pulsed light emission can be substantially larger than the amount of visible light emitted from the visible light projector 2 for the duration of the pulse width. This configuration enables the projection system 1 to measure an object with improved precision.

In this embodiment, the camera 4 captures an image in synchronization with the pulsed light emission by the infrared light projector 3. This configuration enables the camera 4 to capture images that are improved in signal-to-noise ratio through pulsed light emission.

In this embodiment, the infrared light projector 3 includes the pulse light source 31 including a pulse laser device. The pulse laser device enables the projector to emit a large amount of light in oscillating pulses.

In this embodiment, invisible light images projected by the infrared light projector 3 are the measurement patterns 81 to 83 in accordance with a space encoding method. Any other invisible light images can be used such as random dot patterns.

Second Embodiment

A second embodiment will now be described with reference to the attached drawings. In the first embodiment, timing for exposure of the camera 4 coincides with timing for emission of pulsed light from the infrared light projector 3 when the camera 4 captures an image in synchronization with the emission of pulsed light. In the second embodiment, timing for exposure of a camera 4 is delayed for a period with respect to timing for pulsed light emission such that synchronization is achieved.

A projection system 1 according to this embodiment will now be described. As for some configuration and operation identical to those of the projection system 1 according to the first embodiment, redundant descriptions thereof are omitted.

FIG. 7A illustrates a timing for emission of pulsed infrared light from the infrared light projector 3. FIG. 7B illustrates a timing when reflected infrared light after pulse emission in FIG. 7A enters the camera 4. FIG. 7C illustrates a timing for exposure of the camera 4 in coincidence with the timing for pulsed light emission of FIG. 7A. FIGS. 7D, 7E, and 7F illustrate a timing for emission of pulsed infrared light from an infrared light projector 3, a timing for reflected light entry, and a timing for exposure of a camera 4 to light, respectively in accordance with the present embodiment.

FIGS. 7A, 7B, and 7C show an exemplary operation of the projection system in which the timing for exposure of the camera 4 coincides with the timing for pulsed light emission. The example of FIGS. 7A to 7C assumes that an object at a distance of roughly 150 m is measured with the pulse width set to 2 microseconds. In this instance, reflected infrared light traveling at the velocity of light (substantially $3 \times 10^8$ m/second) enters the camera 4 after a lapse of substantially 1 microsecond following the timing for pulsed light emission, as shown in FIG. 7B. The means that if the timing for exposure of the camera 4 coincides with the timing for pulsed light emission, the camera 4 is exposed only to roughly half the total amount of reflected light incident on the camera 4, as shown in FIG. 7C.

To offset this disadvantage, as shown in FIGS. 7D, 7E, and 7F, the camera 4 according to this embodiment captures an image in synchronization with pulsed light emission such that exposure of the camera 4 is delayed for a period Δt with respect to the timing for pulsed light emission. The delay period Δt is based on a reference distance to the estimated location of an object (a subject) subject to projection, as well as the velocity of light, and is set to a period required for light to make a round trip of the reference distance. Consequently, with reference to FIGS. 7E and 7F, an overlap between time taken for light reflected off the object to be incident on the camera 4 and time taken for the camera 4 to be exposed to light increases by the delay period Δt. This configuration can increase the amount of the reflected light exposed by the camera 4 and thereby improve the accuracy in measurement of the object.

The delay period Δt for the projection system 1 is determined in advance at the time of calibration of the projection system 1 or other events, for example. The delay period may be determined by means, such as a user command or at predetermined intervals (e.g. 1 minute), during the projection operation of the projection system 1. The projection system 1 may determine the delay period based on a measured distance to the subject 6 (located in the z direction).

In the projection system 1 according to this embodiment described above, the camera 4 captures an image every time of the pulsed light emission with the delay period Δt from the timing of the pulsed light emission by the infrared light projector 3. This configuration facilitates an increased overlap between time taken for light reflected off the object to be incident on the camera 4 and time taken for the camera 4 to expose and thus improves the accuracy in measurement of the object.

In this embodiment, the delay period Δt is on the basis of a distance to the object and the velocity of light. As a result, the delay period Δt can be adjusted to a period required for pulsed infrared light emitted from the infrared light projector 3 to make a round trip of the distance to the object, so as to increase the amount of the reflected light exposed by the camera 4 to.

In the embodiment described above, the camera 4 exposes during a period identical to the pulse width of emitted infrared light. The exposure period for the camera 4 may be set to a length different from the pulse width. This variant example will now be described with reference to FIGS. 8A to 8C.

FIGS. 8A, 8B, and 8C illustrate a timing for emission of pulsed infrared light from the infrared light projector 3, a timing for reflected light entry, and a timing for exposure of the camera 4, respectively in accordance with this variant example. With reference to FIG. 8C, the exposure period for the camera 4 according to this variant example is set to a period longer than the pulse width of emitted infrared light. This means that the period required for reflected light entry is inside the exposure period for the camera 4 even if the timing for exposure of the camera 4 does not exactly coincide with the timing for reflected light entry. As a result, improvement of the accuracy in measuring the object can be achieved by a simple circuit configuration without excessively complicated timing control over the camera 4.

The exposure time for the camera 4 is set shorter than a pulse cycle (a period T1), i.e. a time interval between emissions of pulsed light from the infrared light projector 3, and set to shorter than or equal to half the interval between emissions of pulsed light, for example. The exposure time for the camera 4 may be set to shorter than or equal to multiple times (e.g. 10 times) the pulse width of emitted light. In such cases, the delay period Δt may be omitted.

Third Embodiment

A third embodiment will now be described with reference to the attached drawings. The camera 4 according to each embodiment described above captures an image in synchronization with emission of pulsed light by the infrared light projector 3. In the third embodiment, an image generator 50 extracts a captured image in accordance with a timing for pulsed light emission, whereas a camera 4 captures images without synchronization with the pulsed light emission.

A projection system 1 according to this embodiment will now be described. As for some configuration and operation identical to those of the projection systems 1 according to the first and second embodiments, redundant descriptions thereof are omitted.

FIGS. 9A, 9B, and 9C illustrate a timing for emission of pulsed infrared light from an infrared light projector 3, a timing for reflected light entry, and a timing for exposure of the camera 4 to light, respectively in accordance with the present embodiment.

With reference to FIG. 9C, the camera 4 according to this embodiment does not synchronize with the timing for pulsed light emission (FIG. 9A) but repeatedly captures images at a predetermined repetition period. This configuration can omit devices, such as a synchronous signal source, for use that gets the camera 4 to capture an image in synchronization with emission of pulsed light.

With reference to FIGS. 9B and 9C, the repetition period at which the camera 4 according to this embodiment captures images is set shorter than the pulse width of emitted light. This means that a period when the reflected light continues to be incident on the camera 4 includes an exposure period for the camera, and an image captured during that period is generated. These images are captured with less extraneous light and other noise components relative to the amount of reflective light and thus allow measurement of an object at a high signal-to-noise ratio.

The image generator 50 extracts captured images generated in the way described above among images captured successively by the camera, and performs processing such as decoding measurement patterns according to the extracted images. A storage 51 stores in advance information regarding a period required for reflected light to make the round trip, and the image generator 50 extracts the captured images described above based on that information and the timing for pulsed light emission, for example.

In the projection system 1 according to this embodiment described above, the camera 4 repeatedly captures images by a time interval shorter than a repetition interval between emissions of the pulsed light by the infrared light projector 3. The image generator 50 extracts captured images in accordance with the timings for pulsed light emission among images repeatedly captured by the time interval. This enables three-dimensional measurement of an object with a high degree of precision on the basis of captured images extracted by the image generator 50. This configuration can omit functions such as control of the camera 4 for synchronization and reduce costs.

In the embodiment described above, the period at which the camera 4 repeats capture of images may be set to longer than or equal to the pulse width of emitted light. This variant example will now be described with reference to FIGS. 10A to 10C.

FIGS. 10A, 10B, and 10C illustrate a timing for emission of pulsed infrared light from the infrared light projector 3, a timing for reflected light entry, and a timing for exposure of the camera 4 to light, respectively in accordance with this variant example.

With reference to FIGS. 10A and 10C, the period at which the camera 4 repeats capture of images in this variant example is longer than or equal to the pulse width of emitted light and shorter than or equal to one half of a pulse cycle, the pulse cycle being the time interval between emissions of pulsed light from the infrared light projector 3. The exposure period for the camera to capture an image is set to longer than or equal to the pulse width and shorter than or equal to one half of the pulse cycle, for example.

In this case, with reference to FIGS. 10B and 10C, one half or more of the period required for reflected light to be incident on the camera 4 is inside one exposure period for the camera, and an image captured during that period is periodically generated. Such images are captured with a smaller amount of extraneous light than that for one pulse cycle and allow three-dimensional measurement of the object with mitigated effects of noise. The image generator 50 extracts these captured images described above and generates image data based on the extracted captured images so as to provide image content that follows the motion of the object.

Other Embodiments

The first to third embodiments described above are provided to illustrate techniques disclosed in this patent application. Techniques according to the present disclosure, however, can be applied to any variations to which change, replacement, addition, omission, or the like are appropriately made, other than the embodiments described above. A new embodiment can be made by combining some constituent elements in any of the embodiments described above. In light of this, other embodiments will be exemplified.

In the embodiments described above, the screen 10 is taken as an example of background members that diffusely reflects visible light. The background member according to the present disclosure is not limited thereto, but may use any materials that absorb or transmit visible light, for example. When the visible light projector 2 of the projection system 1 projects no image content onto the background member, the background member may be a blackout curtain that absorbs visible light without permitting diffuse reflection of infrared light, for example. When the projection system 1 uses an external screen or in similar cases, an infrared light shielding filter that transmits visible light, a light-shielding cover or curtain, or any other light-shielding material may be used as a background member.

In the embodiments described above, the projection system 1 includes the background member and the controls emission of pulsed invisible light. The scope of the present disclosure is not limited to such a configuration. When the projection system 1 includes a background member, the control over emission of pulsed invisible light may be omitted. Likewise, the projection system 1 may omit the background member when the system controls emission of pulsed invisible light. In either of the instances, the projection system that projects image content fit for a shape of an object can measure the shape of the object with a high degree of precision.

When the system omits the control over emission of pulsed invisible light, the infrared light projector 3 may replace the pulse light source 31 with another light source that includes a continuous wave laser or a light emitting diode.

When the system controls emission of pulsed invisible light, the visible light shielding filter 43 may be omitted. In this case, by setting of the amount of pulsed light emission and a threshold for three-dimensional measurement appropriately, the system can measure the shape of the object based on captured images with a high degree of precision.

In the embodiments described above, the visible light projector 2 emits red, green, and blue light each continuously, for example. However, the projector may emit red, green, and blue light in a timeshared system. Further, these colors of visible light as well as infrared light from the infrared light projector 3 may be emitted in a timeshared system.

In the embodiments described above, the projection system 1 lets image content follow the subject 6, for example. An object subject to projection in a projection system according to the present disclosure is not limited to a moving object, but may be a stationary object, such as a building. If the stationary object is subject to projection in the projection system, the site of the object may not necessarily be measured during projection operation.

The embodiments described above are provided to illustrate techniques according to the present disclosure. For that purpose, the accompanying drawings and detailed description are provided.

Consequently, the accompanying drawings and detailed description provided to illustrate the techniques described above may include constituent elements that are not essential for resolving problems as well as those essential for resolving problems. Thus, these non-essential constituent elements, if they are included in the accompanying drawings or detailed description, should not be regarded as essential constituent elements.

Since the embodiments described above are provided to illustrate techniques according to the present disclosure, various kinds of change, replacement, addition, omission, or the like may be made to these embodiments without departing from the scope of the claims and equivalents thereof.

INDUSTRIAL APPLICABILITY

The projection system according to the present disclosure is available for a variety of uses where image content is projected onto an object.

The invention claimed is:
1. A projection system comprising:
 a first light emitter configured to emit a first light onto an moving object;
 a second light emitter configured to emit a second light which includes light wavelength being different from light wavelength of the first light;
 a camera configured to capture the first light; and
 an image generator configured to generate content image data indicating a projection content based on a captured data captured by the camera in connection with the first light being reflected by the moving object,
 wherein the projection content is projected, within an area of an angle of the first light projected, by the second light so as to follow the moving object,
 the first light emitter is configured to emit pulsed light of the first light, and
 the image generator is configured to generate the content image data based on an image captured in accordance with a timing of the pulsed light emission.
2. The projection system of claim 1,
 wherein the camera captures the first light in synchronization with the pulsed light emission.
3. The projection system of claim 2,
 wherein the camera captures the first light every time of the pulsed light emission with a predetermined delay period from a timing of the pulsed light emission.
4. The projection system of claim 3,
 wherein the delay period is on the basis of a distance to the object and the velocity of light.

5. The projection system of claim 1,
wherein the camera repeatedly captures images by a time interval shorter than a repetition interval between emissions of the pulsed light of the second light, and
the image generator extracts the first light captured in accordance with the timing of the pulsed light emission from the first light repeatedly captured.

6. The projection system of claim 1,
wherein an exposure period for the camera to capture the first light is shorter than or equal to half of a pulse cycle for the pulsed light emission.

7. The projection system of claim 1, further comprising a first projector including the first emitter and a second projector including the second emitter.

8. The projection system of claim 1,
wherein the first light is infrared light.

9. The projection system of claim 1,
wherein an image formed by the first light, projected onto the object is a pattern in accordance with a space encoding method.

10. The projection system of claim 1, further including a wavelength selector which is configured to transmit the first light and configured to absorb or reflect the second light.

11. A projection method comprising:
emitting a first light onto an moving object,
emitting a second light which includes light wavelength being different from light wavelength of the first light;
capturing by a camera, the first light being emitted onto the moving object;
generating content image data indicating a projection content based on a result of the capturing; and
projecting the projection content so as to follow the moving object, within an area of an angle of the first light projected, by using a second light,
wherein the emitting the light comprises emitting pulsed light of the first light, and
the image data is generated based on an image captured in accordance with a timing of the pulsed light emission.

12. The projection method of claim 11,
wherein the camera captures the first light in synchronization with the pulsed light emission.

13. The projection method of claim 12,
wherein the camera captures the first light every time of the pulsed light emission with a predetermined delay period from a timing of the pulsed light emission.

14. The projection method of claim 13,
wherein the delay period is on the basis of a distance to the object and the velocity of light.

15. The projection method of claim 13,
wherein the emitting the first light is performed by using a first projector, and
the emitting the second light is performed by using a second projector.

16. The projection method of claim 11,
wherein the camera repeatedly captures images by a time interval shorter than a repetition interval between emissions of the pulsed light of the wavelength of the second light, and
the image generator extracts the first light captured in accordance with the timing of the pulsed light emission from the first light repeatedly captured.

17. The projection method of claim 11,
wherein an exposure period for the camera to capture the first light is shorter than or equal to half of a pulse cycle for the pulsed light emission.

18. The projection method of claim 11,
wherein the first light is infrared light.

19. The projection method of claim 11,
wherein an image formed by the first light, projected onto the object is a pattern in accordance with a space encoding method.

20. The projection method of claim 11,
wherein the capturing the first light projected is performed by using a wavelength selector which is configured to transmit the first light and configured to absorb or reflect the second light.

* * * * *